S. E. CARLIN.
CALCULATING MACHINE.
APPLICATION FILED JUNE 5, 1911.

1,164,630.

Patented Dec. 21, 1915.
5 SHEETS—SHEET 1.

WITNESSES:

INVENTOR:
Samuel E Carlin
BY
ATTORNEY.

S. E. CARLIN.
CALCULATING MACHINE.
APPLICATION FILED JUNE 5, 1911.

1,164,630.

Patented Dec. 21, 1915.
5 SHEETS—SHEET 3.

WITNESSES:

INVENTOR
Samuel E. Carlin
BY
ATTORNEY.

UNITED STATES PATENT OFFICE.

SAMUEL E. CARLIN, OF CHICAGO, ILLINOIS, ASSIGNOR, BY MESNE ASSIGNMENTS, TO UNDERWOOD COMPUTING MACHINE COMPANY, OF NEW YORK, N. Y., A CORPORATION OF NEW YORK.

CALCULATING-MACHINE.

1,164,630.   Specification of Letters Patent.   Patented Dec. 21, 1915.

Original application filed May 10, 1910, Serial No. 560,444. Divided and this application filed June 5, 1911. Serial No. 631,421.

*To all whom it may concern:*

Be it known that I, SAMUEL E. CARLIN, a citizen of the United States, residing at Chicago, in the county of Cook and State of Illinois, have invented certain new and useful Improvements in Calculating-Machines, of which the following is a specification.

This application is a division of my application Serial Number 560,444, filed in the United States Patent Office on or about May 10th, 1910, and to which application reference may be had for an understanding of the parts not specifically described herein.

More particularly the present invention relates to an improved machine of this class having means for returning the typewriter carriage to its initial or starting position from any point of its advancement, and also means for preventing accidental or mischievous operation of the advancing mechanism for the typewriter carriage simultaneously with the operation of the returning mechanism for the carriage to prevent locking of the parts and the consequent damage resulting therefrom.

A further object of the present invention is to provide an improved machine of this character having means for returning the typewriter carriage to any predetermined point intermediate the point to which it has been advanced and the initial or starting position, at the will of the operator so that the typewriter carriage will be properly and quickly positioned for tabulating the amounts on sheets of paper.

A further object of this invention is to provide an improved machine of this class in which the numeral keys may be alternatively used to perform their usual functions, such as printing digits, or an added function, such as tabulating the carriage backwardly or forwardly predetermined amounts corresponding to the values of the numeral keys actuated.

A further object is to provide an improved machine of this class which will be simple, durable and cheap in construction and effective and efficient in operation.

To the attainment of these ends and the accomplishment of other new and useful objects, as will appear, the invention consists in the features of novelty in substantially the construction, combination and arrangement of the several parts hereinafter more fully described and claimed and shown in the accompanying drawings illustrating an embodiment of the invention, and in which—

Fig. 13 is a face view of the bevel gear shown in Figs.

9 to 11, and illustrating the clutch openings by which the clutch pins illustrated in Fig. 12 enable the drive of the bevel gear from the shaft on which it is loosely mounted.

Figure 1:
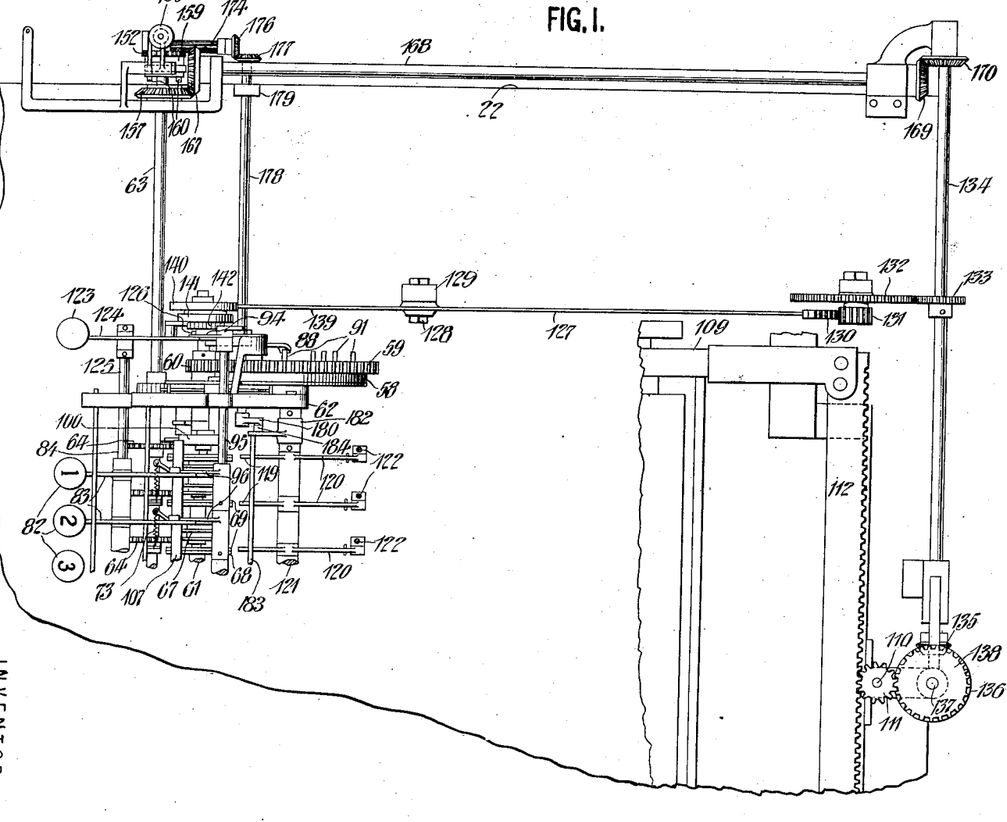
Figure 1 is a fragmentary plan view in detail showing various connections for effecting movements of the carriage.
Figure 5:
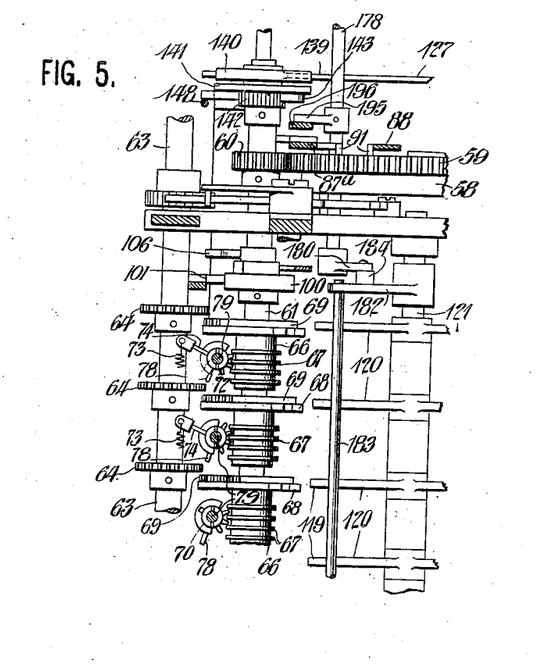
Fig. 5 is a fragmentary horizontal section of the means for driving the carriage backward one, two, three, four, etc., steps, according to the particular key actuated.
Figure 6:
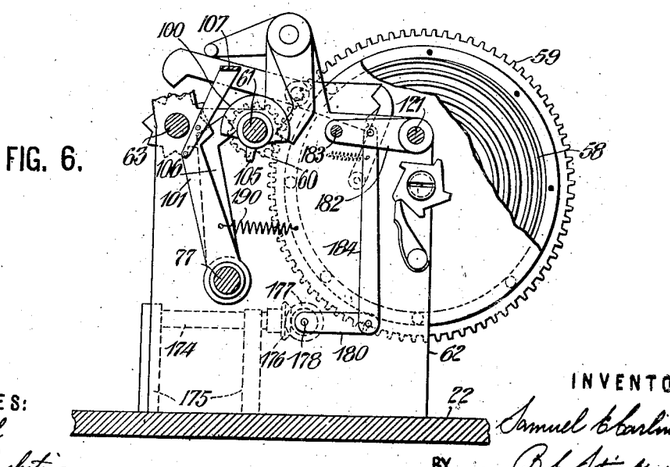
Fig. 6 is a vertical section showing the driving motor and certain connections thereto.

A motor 58 (see Figs. 1, 5 and 6) is provided for imparting motion to the parts and this motor in the present exemplification of the invention is shown as a spring motor which is provided with a gear 59 on its periphery and this gear 59 meshes with a gear 60 on a shaft 61, which is journaled in suitable supports 62. This shaft 61 is adapted to impart a variable degree of rotation to a shaft 63, which latter is arranged adjacent the shaft 61 and preferably in advance thereof. Secured to the shaft 63 and for rotation therewith are a series of gears 64 and selector mechanisms may be provided for controlling the degree of rotation of the shaft 63.

Figure 4:
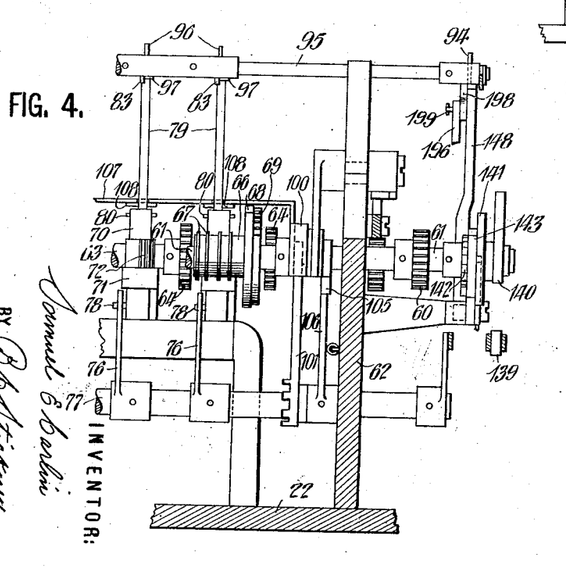
Fig. 4 is a fragmentary vertical section showing details of the parts shown in Fig. 2, looking from left to right of Fig. 2.

Any number of these selector mechanisms may be provided but in the present exemplification of the invention nine are employed, one for each of the nine numeral keys 65 of the typewriter corresponding in values from "1" to "9." The construction and operation of each of these selector mechanisms are the same and therefore the specific description of one will apply equally as well to them all. They each comprise a sleeve 66, which is mounted upon the shaft 61 for rotation therewith and for sliding adjustment longitudinally on the shaft (see Figs. 4 and 5) and the sleeve is provided with peripheral spaced ribs 67. A one-toothed gear 68 is secured to the sleeve 66 and a mutilated gear 69 is also secured to the sleeve. The mutilated gears 69 are provided with a different number of teeth, that is to say, each of the mutilated gears is provided with a number of teeth corresponding to the number of the numeral key 65 of the typewriter, to which it is connected, as will be understood. An upright sleeve 70 is rotatably mounted in a suitable support 71 and is provided with a gear portion 72 (see Fig. 4) which meshes with the ribs 67 on the sleeve 66. An elastic member 73 is connected to an extension 74 on the sleeve by one extremity and is anchored as at 75 to a fixed support. The tendency of this elastic member 73 is to normally rotate the sleeve 70 and the gear 72 so as to move the sleeve 66 on the shaft 61 to a position to bring the corresponding gear 69 in mesh with the gear 64.

The sleeve is adjusted on the shaft 61 to move the gear 69 out of actuating position with respect to the gear 64 by means of an arm 76 which is connected to a rock shaft 77 and this arm engages a projection 78 on the sleeve 70 to rotate the sleeve and the gear 72 in the opposite direction against the tension of the elastic member 73 when the shaft 77 is rocked in one direction. The gear 69 is locked in its non-meshing or inoperating position by means of a stem 79 which is provided with a pin 80 normally seated in a slot 81 in the sleeve 70 and adapted to be moved out of the slot when the stem is raised. Actuating or numeral keys 82 are provided for shifting the stems 79 and these keys are each connected to a lever or arm 83 which is pivotally supported intermediate its ends as at 84 and one extremity is pivotally connected as at 85 to the stem of the key 82. The stem 79 is pivotally connected as at 86 to the other end of the arm at a point remote from the extremity of the arm. An elastic member 87 is provided which tends normally to restore the key and to move the stem 79 in a direction to cause the pin 80 to enter the slot 81 in the sleeve 70.

Figures 7, 8:
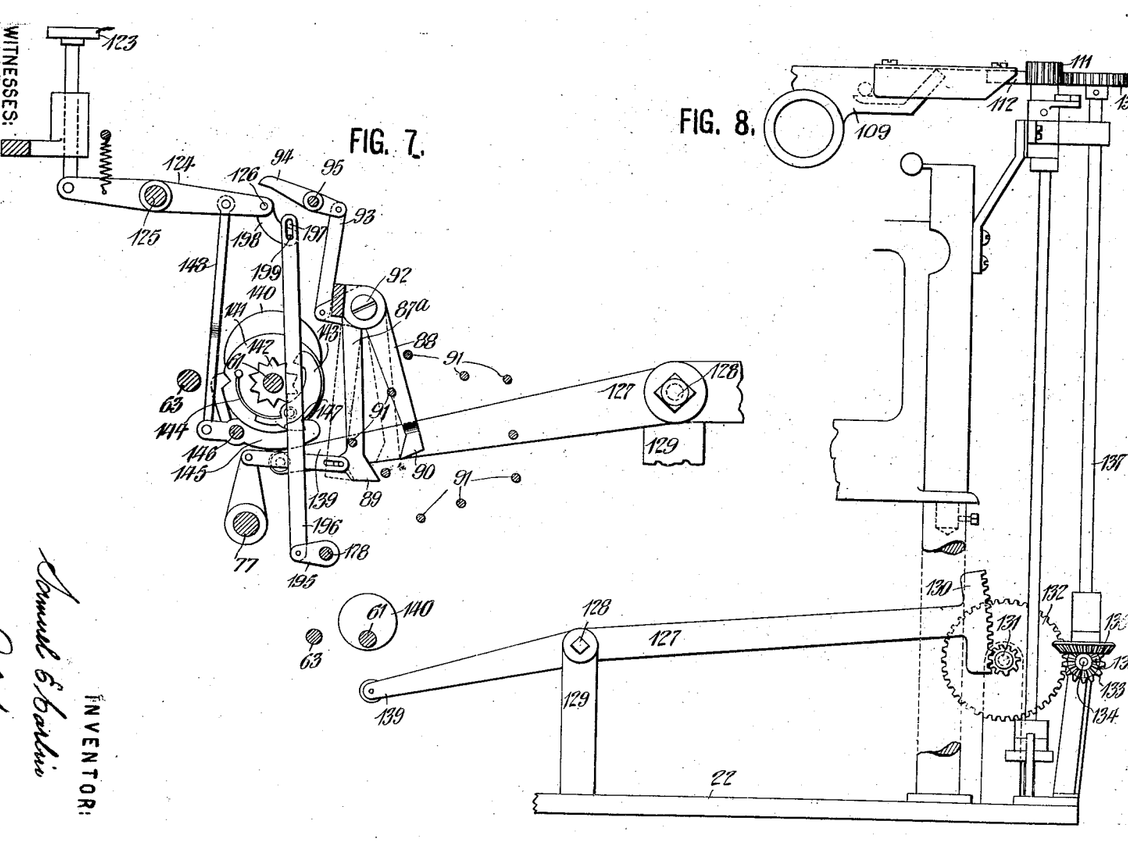
Fig. 7 is a skeleton vertical section showing the means for returning the carriage to its normal starting position from any point in its advancement. In this figure the carriage-returning key 123 is shown in its normal or elevated position, but the position of the link 196 is that which it assumes upon the actuation of the clutch-shifting key 165.
Fig. 8 is a fragmentary vertical section showing on a smaller scale, the connections from the mechanism illustrated in Fig. 7, to the typewriter carriage. The lever 127 is here shown in its initial position.
Figure 9:
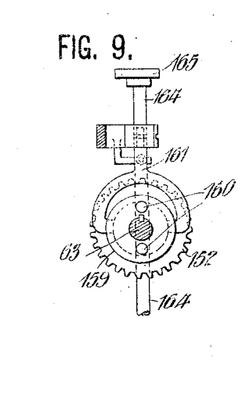
Fig. 9 is a detail of the clutch and key for operating the same, which connects the variable-step driving mechanism to the carriage.
Figure 10:
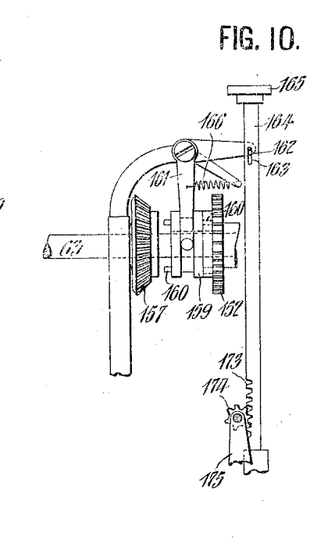
Fig. 10 is a view of the parts shown in Fig. 9, taken at right angles thereto, the said parts being in normal position.
Figure 11:
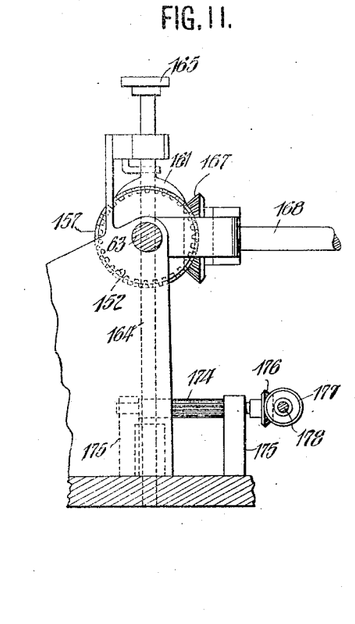
Fig. 11 is a vertical section of certain of the parts shown in Figs. 9 and 10, taken at right angles to Fig. 10, and from the opposite side to Fig. 9.
Figure 12:
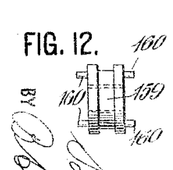
Fig. 12 is a detail view in side elevation of the clutch shown in Figs. 9 to 11.
Figure 13:
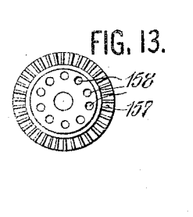

It will thus be seen that when any one of the gears 69 is shifted by the operation of the corresponding key 82, the shaft 63 will be rotated a number of steps of rotation corresponding to the number represented by the key 82, which is depressed. The motor 58 is adapted to be intermittently operated under the control of escapement mechanism comprising arms 87ª, 88, which are provided with extremities 89, 90, projecting toward each other and these extremities are adapted to engage projecting pins or lugs 91 (see Fig. 1 and which are also diagrammatically illustrated in Fig. 7), and these escapement members 87ª, 88 are mounted for movement about a pivot 92. A link 93 is connected at one extremity to the escapement to rock it about its pivot 92 and at its other extremity to a dog 94, which is secured intermediate its ends to a rock shaft 95. Secured also to the rock shaft 95 is a series of dogs or fingers 96, one for each of the arms or levers 83, and the free extremity of each of these dogs or fingers projects into the path of movement of a projection 97 on the extremity of the corresponding arm or lever 83 adjacent the point of pivotal connection 86 of the stem 79 with the arm 83, so that when the latter is rocked by means of the key 82 to shift the stem 79 to release the mutilated gear 69 and thereby permit the latter to be adjusted into operating position with respect to the gear 64, the shaft 95 will also be rocked, the parts being so timed that the gear 69 will assume an operating position before the shaft 95 is rocked. As the shaft 95 is rocked, the escapement arms 87ª, 88, will be rocked about their point of pivotal support to release the motor 58 and when thus released the motor will make one step of rotation.

The connection between the motor and the shaft 61 is so proportioned that on each step of rotation of the motor, the shaft 61 will make one complete rotation and at the completion of this movement, the shaft 77 and its arm 76 will be rocked to shift the gear 69 from its previous active position in mesh with gear 64, to its inactive position on the shaft 61 in which it is released from said gear 64. Cams or projections 105 are also secured to the shaft 61 and are adapted to engage arms 106 which latter are secured to the shaft 77 (see Figs. 4 and 6) and are for the purpose of rocking the shaft 77 to cause the arms 76 secured thereon to engage the projections 78 on the sleeves 70 to rotate the latter against the tension of the elastic members 73 so as to position the slot 81 in the sleeve to receive the pin or projection 80 on the stem 79.

Figure 2:
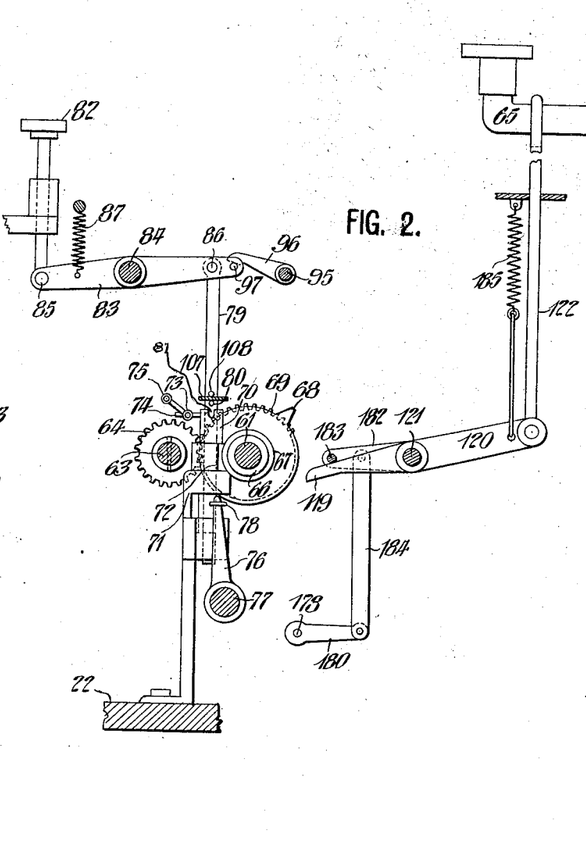
Fig. 2 is a skeleton view in vertical section taken from front to rear, showing the connection from the supplementary numeral keys to the typewriter numeral keys, and the means for interrupting this connection when the supplementary numeral keys are used to traverse the carriage backward predetermined variable amounts. In this figure, the supplementary numeral key 82 therein represented is assumed to be in its depressed position.
Figure 3:
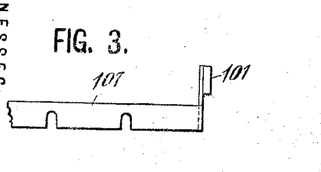
Fig. 3 is a detail view in top plan of the means for locking the remaining supplementary numeral keys after one has been actuated.

In order to lock the remaining keys 82 against actuation when one of the said keys has been actuated, a locking plate or member 107 is provided and is supported by the arms 101, loosely mounted on shaft 77. When shaft 61 is rotated, cams 100 thereon will engage and rock arms 101, and thus bring locking plate 107 into play (see Figs. 1, 2, 4 and 6). This locking plate is provided with recesses adapted to stand astride of the stems 79 and a pin 108 similar to the pin 80 is provided on each of the stems and spaced from the pin 80 so that the plate will pass therebetween, as shown in Fig. 2, to lock the keys against actuation.

When any one of the keys 82 has been actuated the stem 79 will be shifted so as to move the pin or projection 108 to a position above the plate 107 so that when the latter is actuated it will pass below the pin 108 and lock this key in an actuated position while at the same time the remaining keys will be locked against actuation by the plate 107 passing above the pins 108 on the stems 79 corresponding thereto.

As the selector mechanisms which include the gears 69 are rendered active by the keys 82 in the manner already set forth, the corresponding keys 65 of the typewriter will be actuated by means of the one-toothed gears 68, the tooth of each of which latter is adapted to engage the extremity 119 of an arm or lever 120 which is pivotally supported intermediate its ends as at 121 so that the extremity 119 will project into the path of movement of the tooth on the gear 68. The other extremity of this arm or lever is connected by means of a connection 122 to the respective key 65 so as to operate the latter against the tension of a spring 185.

After the carriage 109 of the typewriter has been advanced, it may be returned from any position to which it has been advanced to its original or starting position by means of a key 123, (see Figs. 1 and 7) which key operates an arm or lever 124 pivotally supported intermediate its ends as at 125, and one extremity of this arm or lever is provided with a projection 126, into the path of movement of which the dog 94 projects so that when the key 123 is depressed, the escapement arms 87ª, 88, will be rocked in a manner similar to that already described to release the motor 58.

As the typewriter carriage 109 is advanced step-by-step in the ordinary and usual manner under the influence of the ordinary typewriter escapement and ordinary spring drum, (not shown), by the operation of the keys 65 thereof or by the keys 82, this advancing movement will be communicated to an arm or lever 127 (see particularly Figs. 1, 7 and 8) which is pivotally supported intermediate its ends as at 128 to a suitable support 129 on the base 22. The power of the spring drum or barrel just mentioned is, however, less than that of the motor 58. One extremity of this arm or lever 127 is provided with a toothed segment 130 which meshes with a gear 131 and to which gear is secured a gear 132. This latter gear 132 meshes with a gear 133 on the shaft 134 and this shaft 134 receives its motion through the medium of intermeshing gears 135, 136, the gear 136 being secured to an upright shaft 137. The shaft 137 receives its motion from the gear 111, which meshes with a gear 138 on the shaft 137. The other end 139 of the arm or lever 127 is adapted to be moved toward a cam 140 which is loosely mounted on the shaft 61. This cam 140 is secured to a disk 141 which is also loosely mounted on the shaft 61 and clutch mechanism is provided for locking the cam 140 for rotation with the shaft 61. Any suitable clutch mechanism may be provided but the mechanism shown comprises a star or toothed gear 142, which is secured to the shaft 61 for rotation therewith. A dog 143 is pivotally supported by the disk 141 and an elastic member 144 is provided which tends normally to throw the dog 143 into engagement with the star or toothed wheel 142. This clutch mechanism is adapted to be actuated by the operation of the key 123 when the latter is depressed to rock the escapement arms 87ª, 88. In order to accomplish this result there is provided a second dog 145 which is pivoted to a fixed support 146 and one extremity is adapted to engage a shoulder 147 on the dog 143 to move the latter out of engagement with the star or toothed wheel 142 and against the tension of the elastic member 144. The other end of the dog 145 is connected by means of a link 148 to the arm or lever 124. Thus it will be seen that when the key 123 is depressed to move the dog 145 from the position shown in Fig. 7 and out of engagement with the dog 143, the latter will be released and the elastic member will move it into engagement with the star or toothed wheel 142 to lock the disk 141 and cam 140 for rotation with the shaft. The extremity 139 of the arm or lever 127 will be moved toward the cam 140 a distance corresponding to the extent of the advancing movement of the carriage 109 of the typewriter so that when the key 123 is depressed and the cam 140 rotated with the shaft 61, the cam will engage the extremity 139 of the arm or lever 127, thereby raising or moving the end 130 in the opposite direction which will reverse the direction of rotation of the shaft 137 to move the carriage 109 back to the initial or starting position. When the key 123 is released the dog 143 will be automatically shifted by the dog 145 to release the clutch mechanism.

It is the intention of the present application to provide means whereby the typewriter carriage may be returned to its initial or starting position from any point of its advancement and also to provide means whereby the typewriter carriage may be returned to any point between the point to which it has been advanced and its initial or starting position so as to tabulate the amounts, at the will of the operator, and also to utilize the selector mechanisms which impart a variable movement to the shaft 63, for thus returning the typewriter carriage to the intermediate positions. In order to accomplish this and also to prevent the operation of the typewriter keys 65 during this return movement of the typewriter carriage, mechanism must be provided for shifting the arms or levers 120 so that the extremities 119 thereof will be moved out of the path of movement of the tooth on the one-toothed gears 68. The mechanisms for accomplishing these results will now be described. The gear 152 (see particularly Figs. 1, and 10 to 13 inclusive) is mounted loosely upon the shaft 63. A gear 157 is also loosely mounted on the shaft 63 and spaced from the gear 152. The adjacent faces of the gears 152, 157, are provided with a plurality of apertures 158, and a clutch member or collar 159 is mounted upon the shaft 63 between the gears 152, 157. This clutch member or collar is keyed to the shaft 63 for rotation therewith and is adapted to be shifted on the shaft longitudinally thereof and toward and away from each of the gears 152, 157. Projecting laterally from each face of the clutch member 159 are spaced pins or projections 160 which are adapted to enter the apertures 158 in the respective gears 152, 157. These gears are spaced from each other a sufficient distance to permit the clutch member 159 to be shifted to such a position that when the pins or projections 160 on one face enter the apertures 158 on the respective gears 152, 157, the pins or projections 160 on the opposite face will be disconnected from the respective gears or moved out of the recesses therein, so that when one of the gears is locked for rotation with the shaft 63, the other is free to rotate thereon. The clutch member 159 is adapted to be shifted by means of a key 165 through the intermediary of a bell crank lever 161, one arm of which is formed into a yoke having projections adapted to enter a circumferential groove or slot in the periphery of the clutch member in the ordinary and well known manner. The other arm of the bell crank lever is connected by means of a pin and slot connection 162, 163, with the stem 164 of the key 165 and the slot 163 is preferably so arranged that when the key 165 is depressed the bell crank lever 161 will move the clutch member 159 to lock the gear 157 to the shaft 63. An elastic member 166, such as a coil spring or the like, is provided, one end of which is connected to the yoke arm of the bell crank lever and the other end is anchored to a suitable fixed support and tends normally to shift the bell crank lever 161 to move the clutch member 159 to lock the gear 152 to the shaft 63. Thus it will be seen that when the key 165 is depressed, the gear 157 will be locked to the shaft 63 so that the motion of the shaft will be communicated to the typewriter carriage 109, through the medium of a gear 167 which meshes with the gear 157 and which gear 167 is secured to a shaft 168 extending to the rear of the machine. On the shaft 168 is a gear 169 which meshes with a gear 170 on the shaft 134 and which imparts rotation to the shaft 134 in a direction opposed to the direction of rotation imparted to the shaft 134 by the advancing movement of the typewriter carriage. As the clutch member 159 is shifted to lock the gear 157 to the shaft 63, the key 165 is employed for shifting the arms or levers 120 into an inactive position so that the extremities 119 thereof will be moved out of the path of movement of the tooth of the one-toothed gear 68. This may be accomplished in the following manner: The stem 164 of the key 165 is of some length and is provided with rack teeth 173 which mesh with a toothed cylinder or barrel 174 rotatably mounted in suitable supports 175 and arranged at right angles to the stem 164. Secured to and for rotation with the cylinder or barrel 174 is a gear 176 which meshes with the gear 177 on a shaft 178 (see particularly Figs. 1, 2, 3, 5, 11 and 13). This shaft 178 is journaled in a suitable bearing 179 and the supports 62 and is provided with a crank arm 180. Loosely mounted upon a suitable support, preferably the shaft 121, are arms 182 which are connected by a cross bar or rod 183. This bar or rod is arranged above and projects across the arms 120 forward of the pivot thereof and the arm 182 is connected to one of the arms 180 by means of a link or connection 184 so that when the key 165 is depressed, the cylinder or barrel 174 will be rotated and this rotary motion will be imparted to the shaft 178 to move the arm 180 thereon downwardly. This movement of the arm 180 will draw the bar or rod 183 into engagement with the extremities of the arms 120 to depress the latter to move them out of the path of movement of the tooth of the one-toothed gears 68. These parts will be held in this position as long as the key 165 is held depressed, but when the key is released, the elastic member 166 will return the key and at the same time will shift the clutch member 159 to unlock the gear 157 and lock the gear 152 and the return movement of the key will also raise the arm 180 to elevate the bar or rod 183 to permit the extremities 119 of the arms 120 to re-assume positions in the path of movement of the tooth on the gears 68.

Should it happen that one of the keys 82 is accidentally depressed or mischievously actuated at the same time that it is desired to return the typewriter carriage to its initial or starting position by the actuation of the key 123, it will be apparent that the key 65 of the typewriter, corresponding to the key 82 which has been accidentally actuated, would be operated and this would tend to cause the typewriter carriage to advance, while the actuation of the key 123 would tend to move the carriage in the opposite direction, thereby locking the parts which might result in serious damage. In order therefore to obviate this difficulty and to prevent the locking of the parts, mechanism is provided whereby the actuation of the key 123 will actuate the bar or rod 183 to depress or move the extremities 119 of the arms or levers 120 out of the paths of movement of the teeth of the one-toothed gears 68 and thereby render the advancing mechanism of the typewriter carriage inactive, even though both of said keys are simultaneously actuated. Suitable mechanisms for accomplishing this result will now be described, reference being had particularly to Figs. 4, 5 and 7. Secured to the shaft 178 is an arm 195, connected to which, at one extremity, is a link 196. The other extremity of the link is provided with a slot 197 and this extremity of the links is connected to an extension 198 on the arm or lever 124 by means of a pin or projection 199 which extends into the slot to form a loose connection. When the key 123 is depressed, the pin 199 will engage the end of the slot 197 in the link 196 to rock the shaft 178 in a direction to lower the bar or rod 183 into engagement with the extremities 119 of the arms or levers 120 to depress the latter and hold them depressed until the key 123 is released. This pin and slot connection between the link 196 and the arm or lever 124 permits the shaft 178 to be rocked by the one-toothed gears 68 when they engage the extremities 119 of the arms or levers 120 and when the shaft 178 is thus rocked the link will be moved and the key 123 will remain stationary and will be prevented from bobbing up and down. The pin and slot connection 162, 163, on the stem 164 of the key 165 is also provided so as to permit the key to move without effecting the actuation of the parts when the shaft 178 is rocked by the operation of the arms or levers 120 through the medium of the one-toothed gears 68.

In the operation of the device during the advancing movement of the carriage 109, the shaft 134 will be rotated, and this will in turn rotate the gears 132, 131, to move the arm 127 about its pivot so that the free extremity thereof will be moved toward the cam 140. When it is desired to return the typewriter carriage to its original or starting position from any point to which it has been advanced, the key 123 is actuated and this key will lock the cam 140 for rotation with the shaft 61, at the same time the escapement arms 87$^a$, 88, will be rocked to release the motor 58 to permit it to make one step of rotation. With the parts in this position, the rotation of the shaft 61 will rotate the cam 140, which latter will engage the extremity of the arm 127 to move it in the opposite direction, which movement will impart a reverse rotary movement to the shaft 134 and the typewriter carriage will be thus returned. When the key 123 is actuated, the bar or member 183 will be depressed to move the extremities 119 of the arms or levers 120 out of the path of movement of the teeth of the one-toothed gears 68 to prevent the actuation of the keys 65 of the typewriter proper in the event one of the keys of the series 82 has been accidentally actuated. When it is desired to return the typewriter carriage 109 to a predetermined point intermediate the initial or starting point and the point to which it has been advanced by the employment of the selector mechanisms and which mechanisms impart a variable motion to the shaft 63, the key 165 is actuated to unlock the gear 152 from the shaft 63 and to lock the gear 157 to the shaft 63. At the same time the bar or rod 183 will be depressed to move the extremities 119 of the arms 120 out of the paths of movement of the one-toothed gears 68. With the parts thus adjusted, the key of the series 82, corresponding to the number of spaces it is desired to return the carriage 109, is actuated. The actuation of this key will render the corresponding mutilated gear 69 operative and at the same time the shaft 95 will be rocked by means of the engagement of the pin or projection 97 on the arm or lever 83 with the dog 96. The rocking of this shaft 95 will shift the escapement arms 87$^a$, 88, to release the motor 58, thereby permitting the latter to move one step of rotation. This rotary motion of the motor will be imparted to the shaft 63 through the medium of the gear 64 which meshes with the mutilated gear 69 that has been locked to the shaft 61. During this operation the key 165 must be held depressed and when thus held, the variable motion of the shaft 63 will be imparted to the shaft 134 through the medium of the gears 157, 167, shaft 168 and gears 169, 170, to rotate the shaft 134 in a direction to return the carriage 109 a number of steps equal to the number of steps of rotation imparted to the shaft 63. After the typewriter carriage has been thus returned, the gear 69 which has been locked to the shaft 61 will be automatically released or rendered inactive and the key 82 returned in the manner as fully set forth in the application above referred to. When the key 165 is released, the gear 157 will be unlocked from the shaft 63. The bar or rod 183 will be elevated so as to permit the extremities 119 of the arms or levers 120 to move to such positions that any one of them may be actuated to operate the corresponding keys 65 of the typewriter when one of the mutilated gears 69 is rendered active by the operation of the respective keys 82.

What is claimed as new is—

1. The combination of a paper support adapted for advancement, mechanism set by the advancement of the paper support for shifting the support in the opposite direction from any position thereof and to its initial and starting position, including a driving and a driven element, a normally inactive connection between said elements, means for rendering said connection active at will, and means for automatically rendering said connection inactive.

2. The combination of a paper support adapted for advancement, mechanism set by the advancement of the paper support for shifting the support in the opposite direction from any position thereof to its initial or starting position, a normally inactive cam for operating said mechanism, and means for imparting motion to the cam to operate the same.

3. The combination of a paper support movable in advancing direction, a segment bearing lever operatively connected with the said advancing paper support and adapted to be adjusted thereby, and means adapted to engage and move said lever in the opposite direction for automatically returning the paper support from any of its positions.

4. The combination of a paper support movable in advancing direction, a segment bearing lever operatively connected with the said advancing paper support and adapted to be adjusted thereby, means adapted to engage and move said lever in the opposite direction for automatically returning the paper support from any of its positions, and means for controlling said means at will.

5. The combination of a paper support movable in advancing direction, a segment bearing lever operatively connected with the said advancing paper support and adapted to be adjusted thereby, a cam adapted to engage and move said lever in the opposite direction for returning the paper support from any of its positions, operating mechanism for the cam, a normally inactive connection between the cam and its operating means, and means for controlling said connection at will.

6. The combination of a paper support movable in advancing direction, a segment bearing lever operatively connected with the said advancing paper support and adapted to be adjusted thereby, a cam adapted to engage and move said lever in the opposite direction for returning the paper support from any of its positions, operating mechanism for the cam, a normally inactive connection between the cam and its operating means, means for controlling said connection at will, and means for automatically rendering said connection inactive.

7. The combination of a paper support located at the rear of the machine and movable in advancing direction, a segment bearing lever operatively connected with the said advancing paper support and adapted to be adjusted in one direction thereby, a cam adapted to engage and move said lever in the opposite direction for automatically returning the paper support from any of its positions, and means located at the front of the machine for controlling the movement of the cam.

8. The combination of a paper support located at the rear of the machine and movable in advancing direction, a segment bearing lever operatively connected with the said advancing paper support and adapted to be adjusted in one direction thereby, a cam adapted to engage and move said lever in the opposite direction for automatically returning the paper support from any of its positions, operating means for the cam, a normally inactive coupling between the cam and its operating means, means for rendering said coupling active, and a key located at the front of the machine for controlling the last said means.

9. The combination of a paper support movable in advancing direction, a shaft operatively connected with the paper support, a pivotally mounted member provided with a rack, a gear operatively connecting said rack and shaft whereby the operation of the shaft during the movement of the paper support in one direction will move the said member about its pivot, a cam adapted to engage and move the said pivoted member in the opposite direction to reverse the direction of movement of the shaft, operating means for the cam, a normally inactive connection between the cam and its operating means, and means controlling the said connection at will.

10. The combination of a paper support movable in advancing direction, a shaft operatively connected with the paper support, a pivotally mounted member provided with a rack, a gear operatively connecting said rack and shaft whereby the operation of the shaft during the movement of the paper support in one direction will move the said member about its pivot, a cam adapted to engage and move the said pivoted member in the opposite direction to reverse the direction of movement of the shaft, operating means for the cam, a normally inactive connection between the cam and its operating means, means controlling the said connection at will, and means for automatically rendering said connection inactive.

11. The combination of a paper support movable in advancing direction, a shaft, means whereby the advancement of the paper support will operate the shaft, a member operatively connected with said shaft and having a variable degree of movement in one direction imparted thereto by the shaft, and means adapted to engage and move the said member in the opposite direction for imparting movement to and reversing the direction of movement of the shaft, to return the paper support from any of its positions.

12. The combination of a paper support movable in advancing direction, a shaft, means whereby the advancement of the paper support will operate the shaft, a member operatively connected with said shaft and having a variable degree of movement in one direction imparted thereto by the shaft, means adapted to engage and move the said member in the opposite direction for imparting movement to and reversing the direction of movement of the shaft, to return the paper support from any of its positions, and means for controlling the last said means at will.

13. A key machine embodying recording mechanism actuating means a paper support movable in advancing direction, mechanism for returning the paper support from any position to which it has been advanced, an actuating key for controlling the last said mechanism, means for rendering the recording mechanism actuating means inactive during the return movement of the carriage, and mechanism including a loose connection with the said key whereby the operation of the key will also actuate the said means and permit the latter to be actuated independently with respect to the key.

14. The combination with a carriage, of a lever connected to move amounts corresponding to the movement of the carriage, and a cam having a definite movement adapted to actuate said lever to return said carriage from any point in its travel.

15. The combination with a traveling carriage, of a set of keys, operative connections enabling said keys to cause an invariable travel of said carriage in one direction, and connections enabling the same keys to cause a graded travel of said carriage in the opposite direction.

16. The combination with a traveling carriage, of a set of keys, operative connections enabling said keys to cause an invariable travel of said carriage, and connections enabling the same keys to cause a variable travel of said carriage.

17. The combination with a traveling carriage having a step-by-step advancing movement, of a series of keys for controlling the movement of said carriage, a second series of keys capable of controlling said first-mentioned series of keys, and means for enabling said second-mentioned series of keys to control the return movement of said carriage.

18. The combination with a traveling carriage, of a set of numeral keys connected to enable a step-by-step advancing movement of said carriage, a second set of keys for actuating said first-mentioned keys, and means for concomitantly rendering said second-mentioned set of keys incapable of causing an actuation of said first-mentioned set of keys and capable of causing movements of said traveling carriage.

19. The combination with a traveling carriage having a step-by-step advancing movement, of a series of keys for controlling said step-by-step movement, a second series of keys for actuating said first-mentioned series of keys and thereby causing a step-by-step movement of said carriage, and means for rendering said second series of keys incapable of actuating said first-mentioned series of keys and capable of causing variable return movements of said carriage.

20. The combination with a traveling carriage having a step-by-step advancing movement, of a source of power, a normally-interrupted driving train between said source of power and said traveling carriage, a series of numeral keys connected to control the step-by-step movements of said carriage, a second series of numeral keys connected to actuate said first-mentioned series of numeral keys, and means to enable said second-mentioned series of numeral keys to complete said driving train to cause variable movements of said carriage.

21. The combination with a traveling carriage, of a series of keys so connected that any one of them can control step-by-step movements of said carriage, a source of power, a normally-interrupted driving train between said source of power and said carriage, said driving train being interrupted at a plurality of different points, and means enabling said keys to complete said driving train at said different points to cause traveling movements of said carriage of different magnitudes according to the keys actuated.

22. The combination with a traveling carriage, of a series of keys, type actions controlled by said keys, a source of power, a driving train between said source of power and said carriage enabling the traversing of said carriage by said source of power, and means controlled from said driving train for preventing the actuation of said keys while said carriage is traveling.

23. The combination with a traveling carriage, of a series of keys, type actions controlled by said keys, a source of power, driving connections between said source of power and said carriage enabling the traversing of said carriage by said source of power, driving connections between said keys and said type actions enabling the actuation of said type actions from said source of power, and means for concomitantly connecting said keys to control the traversing movement of said carriage by said source of power and disconnect said keys to prevent the actuation of said type actions by said source of power.

24. The combination with a traveling carriage, of a series of type actions, a source of power, driving connections between said source of power and both said traveling carriage and said type actions, and means for preventing the concomitant driving of said carriage and the actuation of said type actions by said source of power.

25. The combination with a traveling carriage having an intermittent movement in one direction, of a member having a movement corresponding to that of said carriage, and an actuator for said member having always an invariable throw arranged to actuate said member so as to return said carriage from any point after a prior movement.

26. The combination with a traveling carriage having an intermittent movement, of a follower connected to said carriage and moving with said carriage step by step, and a cam with a fixed throw engaging said follower to return said carriage the same amount it has traveled forward at any point in the forward movement of said carriage.

27. The combination with a traveling carriage, of a rack on said carriage, a shaft, a gearing connecting said shaft with said rack, a source of power, and selective drives between said source of power and said shaft, one of said drives enabling a movement of said carriage dependent upon the prior movement thereof and another of said drives enabling variable movements of said carriage selective at the will of the operator.

28. The combination with a traveling carriage, of a source of power for traversing said carriage, and two different drives between said source of power and said carriage, one of said drives traversing said carriage an amount dependent on the prior movement thereof and the other of said drives having a plurality of points of interruption, which when completed correspond individually to variable movements of said carriage.

29. The combination with a traveling carriage, of a source of power, a driving train between said source of power and said carriage, a key for enabling the definite extent of movement of said driving train by said source of power, a second driving train between said carriage and said source of power, and a series of keys for enabling variable drives of said train by said source of power to enable variable movements of said carriage.

30. The combination with a traveling carriage, of a source of power for traversing said carriage, a train of connections between said source of power and said carriage, and means to give a certain part of said train of connections a single rotation so as to give any amount of movement to said carriage up to the full extent thereof.

31. The combination with a traveling carriage, of a source of power for traversing said carriage, a train of connections between said source of power and said carriage, means to give a certain part of said train of connections a single rotation so as to give any amount of movement to said carriage up to the full extent thereof, a second train of connections between said carriage and said source of power, said second train of connections being interrupted at a plurality of points, a series of mutilated gears at said interrupted points having variable numbers of teeth corresponding to different movements of said carriage, and a series of keys for controlling the activity of said mutilated gears and thus corresponding degrees of movement of said carriage.

32. The combination with a traveling carriage, of type actions coöperating with said carriage to write on a work-sheet carried by said carriage, power means connected to operate said type actions, driving connections to said power means enabling the traversing of said carriage a predetermined amount, driving connections to said carriage enabling the traversing of said carriage an indefinite amount, controlling means connected to interrupt the connections between said power means and said type actions during the operation of said predetermined driving connections, and controlling means arranged to interrupt the connections between said power means and said type actions during the traversing of said carriage an indefinite amount by said second-mentioned driving connections.

33. The combination with a traveling carriage, of a series of type actions arranged to coöperate with said carriage to write on a work-sheet carried by said carriage, a source of power, driving connections between said source of power and said type actions enabling the operation of said type actions by said source of power, driving connections between said source of power and said carriage enabling the traversing of said carriage by said source of power, a series of keys for controlling said second-mentioned driving connections to enable different definite movements of said carriage corresponding to the keys actuated, said series of keys being connected to control the actuation of said type actions by said source of power through said first-mentioned driving connections, driving connections from said source of power to said carriage enabling variable indefinite traversing movements of said carriage by said source of power, said three driving connections having parts in common, and said two last mentioned driving connections having parts in common to said carriage, a key for simultaneously completing the driving connections between said source of power and said carriage under the control of said series of keys, and simultaneously interrupting the connection between said source of power and said type actions, so as to prevent the concomitant actuation of said type actions and traversing of said carriage under the control of said series of keys, and a key for concomitantly interrupting the connections between said source of power and said type actions and bringing into play the driving connections between said source of power and said carriage for traversing said carriage an indefinite amount, so as to prevent the concomitant actuation of said type actions and traversing movement of said carriage.

34. The combination with a traveling carriage, of a series of type actions coöperating with said carriage to write on a work-sheet carried by said carriage, connections to said type actions to operate the same, a source of power, operating means actuated by said source of power and arranged to operate said connections to actuate said type actions, driving connections driven by said source of power for traversing said carriage, and controlling means for bringing said last-mentioned driving connections into play and moving said first-mentioned connections beyond the sphere of operation of said operating means, so as to prevent a concomitant traversing movement of said carriage and actuation of said type actions by said source of power.

35. The combination with a traveling carriage, of a series of type actions coöperating with said carriage to write on a work-sheet carried by said carriage, connections to said type actions to operate the same, a source of power, operating means actuated by said source of power and arranged to operate said connections to actuate said type actions, driving connections driven by said source of power for traversing said carriage, driving connections from said source of power to said carriage for traversing said carriage, said last two mentioned driving connections being alternatively operative so as to give different kinds of movement to said carriage, and controlling means for both of said driving connections arranged to bring one or the other into play, and to concomitantly move said first-mentioned connections beyond the sphere of actuation of said operating means, so as to prevent simultaneous movements of said carriage and actuation of said type actions.

36. The combination with a traveling carriage, of numeral keys connected to print and control movements of said carriage, keys connected to dominate said numeral keys, means connecting said dominating keys with said carriage to control variable movements of the latter, and silencing means for alternatively interrupting the connection of said dominating keys to said carriage through said numeral keys and through said connecting means.

37. The combination with a carriage, of a shaft connected to traverse said carriage, a motor for driving said shaft, a fixed throw driving connection between said motor and said shaft enabling the automatic full return of said shaft irrespective of its advancing movement, and a variable drive connection between said motor and said shaft enabling selective variable movements of said carriage.

38. The combination with a carriage, of a shaft connected to traverse said carriage, gearing connected to drive said shaft, a sector lever connected to drive said gearing, and a cam for operating said sector lever.

In testimony whereof I have signed my name to this specification, in the presence of two subscribing witnesses, on this 26th day of May A. D. 1911.

SAMUEL E. CARLIN.

Witnesses:
NINA J. HALSNE,
J. H. JOCHUM, Jr.